United States Patent [19]

Falkenhain et al.

[11] 4,118,459

[45] Oct. 3, 1978

[54] CHEMICALLY REMOVING IRON FROM GRITS

[75] Inventors: Wilhelm Falkenhain, Niederkassel-Ranzel; Ernst Feder, Troisdorf, both of Germany

[73] Assignee: Dynamit Nobel Aktiengesellschaft, Troisdorf, Bez. Koeln, Germany

[21] Appl. No.: 766,420

[22] Filed: Feb. 7, 1977

Related U.S. Application Data

[63] Continuation of Ser. No. 492,810, Jul. 29, 1974, abandoned.

[30] Foreign Application Priority Data

Aug. 1, 1973 [DE] Fed. Rep. of Germany ....... 2338937

[51] Int. Cl.$^2$ ...................... C01G 49/02; C01G 53/10
[52] U.S. Cl. .................................... 423/142; 51/293; 51/309 R; 423/150
[58] Field of Search ............... 423/142, 147, 150, 132; 51/293, 307, 309

[56] References Cited

U.S. PATENT DOCUMENTS

| | | | |
|---|---|---|---|
| 2,359,401 | 10/1944 | Wulff | 51/309 |
| 2,368,282 | 1/1945 | Wulff | 51/309 |
| 3,216,792 | 11/1965 | Udy | 423/147 |
| 3,224,874 | 12/1965 | Daugherty | 423/142 |
| 3,273,997 | 9/1966 | Wilson | 423/150 |
| 3,497,459 | 2/1970 | Nakamura et al. | 423/150 |
| 3,781,405 | 12/1973 | Allan et al. | 423/142 |

OTHER PUBLICATIONS

Practical Aspects of Design of Industrial Appl. of Hydrocyclone Part 1, Filtration and Separation Jul./Aug. 1969, pp. 361–367, Part II, Filtration and Separation Nov./Dec. 1969, pp. 651–657, Trawinski.
Trawinski, Chemie-Anglgen-Verfahren, Issues 4 and 5, 1970, pp. 84–86, 93, 94.

*Primary Examiner*—Donald J. Arnold
*Attorney, Agent, or Firm*—Burgess, Dinklage & Sprung

[57] ABSTRACT

Iron is removed from grits, e.g. crushed corundum by contacting the grits with aqueous hydrochloric acid for dissolving of the iron and provision of a suspension of the grits in the acedic aqueous medium; water is added to the suspension and it is then centrifuged; water is added to the grit-rich fraction and the resulting suspension is subjected to a second centrifuging step.

13 Claims, 1 Drawing Figure

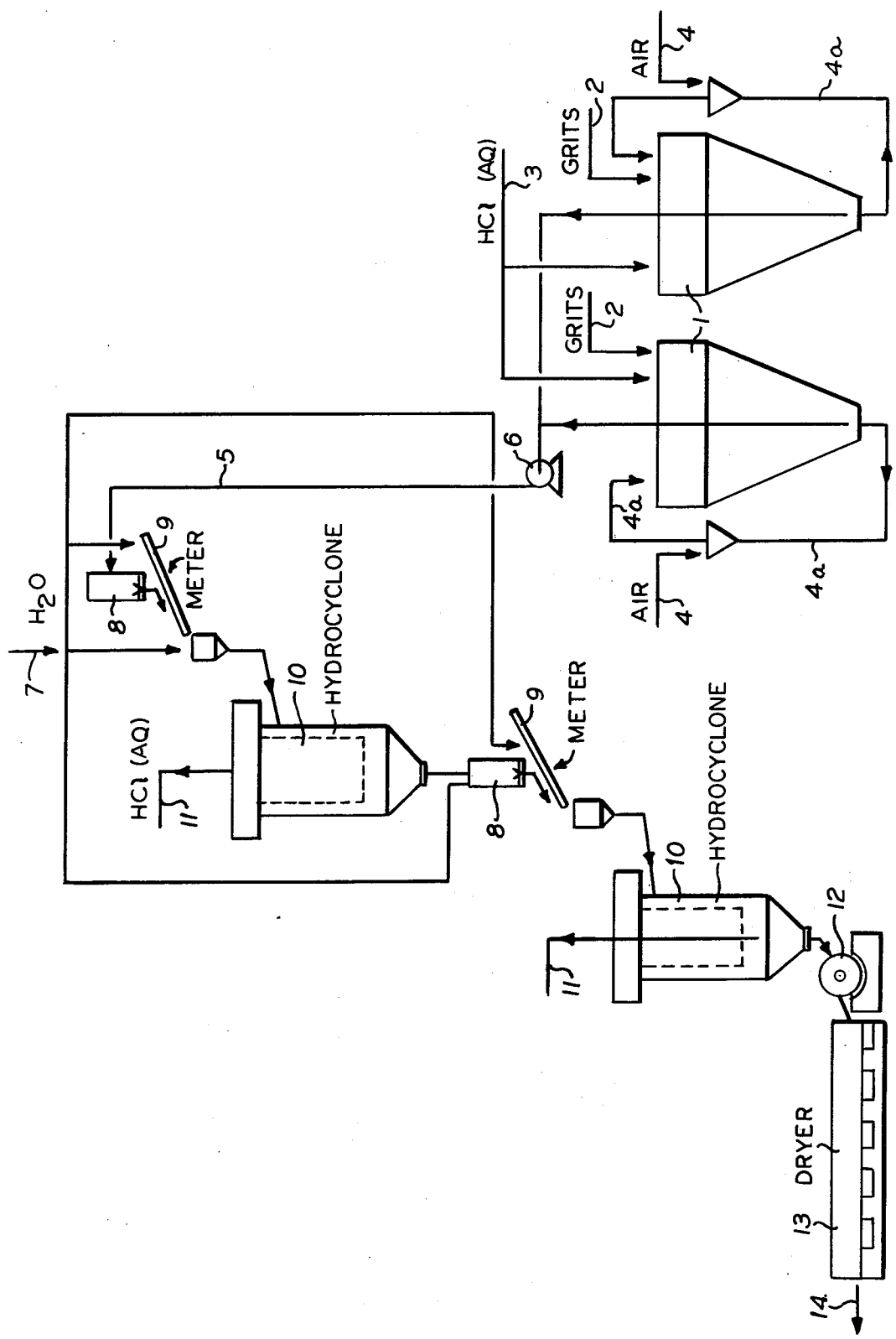

CHEMICALLY REMOVING IRON FROM GRITS

This is a continuation of application Ser. No. 492,810 filed July 29, 1974 now abandoned.

BACKGROUND

Grits such as crushed corundum contain, after crushing grinding and grading, a more or less great percentage of iron, which is undesirable in the manufacture of grinding wheels, for example, or other ceramically bonded products. This iron content is partially removed magnetically from coarse grits. In the case of fine grits, however, magnetic iron removal is not possible.

The iron is then removed by chemical methods, using for example 20% hydrochloric acid in a batch-wise procedure. In general, two known processes are used, which can be explained as follows using corundum as an example:

1. Removal of iron by washing in boiling hydrochloric acid.

In this process, 18 wt-% hydrochloric acid is brought to a boil in enameled, steam-heated kettles. The corundum is sprinkled into the boiling acid. The iron removing process takes two hours. Then the corundum-and-acid mixture is dumped into a settling tank made of plastic. After 7 to 8 washings with fresh water and decantations, the acid is removed. The washed corundum is then poured into drying hurdles and dried in steam-heated or gas-heated circulating air dryers.

This method of iron removal by boiling hydrochloric acid is very effective, but it requires a great deal of hand labor and is very time consuming and expensive. In addition, it is very difficult to neutralize all of the vapors of the boiling acid. Another problem occurs when the acid is poured off or decanted, in that from time to time severe acid surges occur which are technically very difficult to neutralize. Both the neutralization of the vapors and the discharge of the acid into the sewers create great problems for the environment.

2. Removal of iron with cold hydrochloric acid or hydrochloric acid warmed to about 60° C.

In this process the corundum is added to cold or slightly heated hydrochloric acid in plastic containers. The washing process is performed with an electrically powered agitator. The washing with water is performed in the same vessel by repeated stirring, followed by settling, and repeated changes of the water.

At the end of the washing process the corundum must be removed by pumping or by hand from the washing tanks and placed on drying hurdles and then further dried in drying ovens. This process, too, requires much hand labor.

The need which according exists for a continuously performable process for the removal of iron from grits is made difficult to satisfy by the fact that severe erosion is produced in all equipment that comes in contact with this material owing to its abrasiveness caused by its hardness and the manner in which it is ground.

THE INVENTION

The subject of the invention is a process for the removal of iron from coarse or fine grits with aqueous hydrochloric acid followed by the washing out of the acid, characterized in that the grits are agitated in aqueous hydrochloric acid, and, after removal of the iron, are taken from the iron removal tank in the form of a continuous stream of aqueous hydrochloric acid suspension, and are passed in suspension form through at least two centrifugal separators arranged in tandem and fed with fresh water, whereupon a suspension, free of acid, is subjected to a preliminary dewatering in a continuously operating filter and is dried by passing it through a drying apparatus.

The term "grits" as used in this specification includes natural hard materials and especially inorganic materials and materials made by melting processes and having a Mohs hardness of 7 to 9, which are used as abrasives and for other purposes, examples being the various brown and white types of corundum, silicon carbide, zirconium corundum in special cases, garnet minerals, etc.

In contrast to the conventional process, in the present process the grits are generally not separated into their individual sizes prior to the removal of the iron. The suspension of grits may accordingly contain grain sizes from about 2 all the way up to 500 microns. It is nevertheless also possible to remove iron from partially size-graded or fully separated grain sizes by this method.

The removal of the iron can be performed with an approximately 20%, solution of hydrochloric acid, cold or heated if desired to as much as 70° C. It is preferred to give the iron removal tank, which may be made for example of acid-resistant plastic such as hard PVC, a funnel shape, and to discharge the suspension at the bottom. The agitation can be effected with any desired type of stirring unit. Indirect agitation, by means of compressed air, for example, is advantageous on account of the danger of corrosion. The compressed air in this case may be introduced into the tank from the bottom, or the hydrochloric acid suspension may be stirred by removing part of the suspension through a gap and feeding it back into the tank by compressed air or by means of an air lift pump.

It is possible to provide a storage tank following the iron removal tank and equip it with a similar stirring means.

It is also possible to insert between the iron removal tank and the centrifugal separator a settling tank in which part of the hydrochloric acid can be removed free of grits. Preferable two iron removal tanks are used, the iron removal being performed in one while the contents of the other, in which the iron removal has been completed, are being fed into the centrifugal separators. In this manner all of the hydrochloric acid is diluted and constantly carried away without acid surges and can easily be neutralized before discharge into the sewers.

The grits are generally sprinkled steadily or in portions into the iron removal tank and after being stirred for about two hours, or less if the hydrochloric acid is heated, they will be free of iron.

The hydrochloric acid suspension of grits may be fed through a tube to the first centrifugal separator in any desired manner, although indirectly acting pumps are preferred. An example of such a pump is the tube-and-roller pump. It is also possible, however, to perform the pumping with compressed air, or to pump the suspension to the desired height by means of vacuum chambers disposed above the pipe and operating alternately.

Before the entry of the suspension into the centrifugal separator the feeding of measured amounts of fresh water is performed through a metering system, such as a metering nozzle, fresh water being introduced also laterally into the separator, if desired.

The feeding of the suspension into the centrifugal separator is usually done tangentially, and the suspension from which the acid has been removed is discharged at the bottom of the separator, the hydrochloric acid waste water being generally taken from the center of the separator through a tube.

Surprisingly, a very extensive removal of the acid takes place even in the first separator, as well as a thorough separation of waste hydrochloric acid solution and of the grit suspension, so that only slight losses occur, even in the case of fines.

For the removal of residual amounts of acid, a second, similarly operating centrifugal separator is generally provided. The amount of solid suspension taken from the first separator is generally regulated by means of a metering device, such as a metering nozzle for example.

It is possible to provide a third centrifugal separator, especially for reasons of safety.

For improved separation and more rapid settling of the solids, flocculating agents may be fed to the separators. Suitable for this purpose are, for example, non-ionogenic or weakly ionogenic polymeric substances having molecular weights ranging from 50,000 to about 15,000,000. Among those which have proven valuable for this purpose are those on the basis of carbohydrates as well as polymers or copolymers of acrylamide, in amounts of about 0.2 to 5 grams per cubic meter of suspension.

The acid free solid suspension leaving the last separator is delivered, with control of the rate of flow, to a continuously operating filter. Rotary filters are preferred for this purpose, such as rotary cell filters, flat filters or other filters from which the filtered solids are continuously removed or stripped.

In contrast to conventional processes, there remains in the product in this case a residual moisture content of generally only 10 to no more than 15%.

The rest of the drying is best performed by passage through a directly or indirectly heated drying apparatus, such as for example a steel drying belt, a heated trough, or similar continuously operating drying apparatus.

Thus, the invention provides a process for removing of iron from grits with aqueous hydrochloric acid. A mixture of grits and aqueous hydrochloric acid is agitated for removal of the iron from the grits, for the provision of a first suspension of the grits in an aqueous hydrochloric acid medium in which the iron is dissolved. Water is added to the first suspension to form a second suspension, and the second suspension is centrifuged and thereby separated into a specifically lighter fraction rich in hydrochloric acid and a specifically heavier fraction rich in grits. Water is added to the said specifically heavier fraction to form a third suspension, and the third suspension is centrifuged to produce a specifically lighter fraction rich in hydrochloric acid and a specifically heavier fraction rich in grits.

The specifically heavier fraction produced in the second centrifuging step can be filtered to provide a filter cake containing the grits, and the filter cake can be dried to provide dried grits substantially free of iron.

In a preferred manner of carrying out the invention, the first step, wherein the aforesaid first suspension is produced, is performed batchwise in at least two removal vessels synchronized in operation to provide a continuous supply of the first suspension, whereby the first suspension can be continuously subjected to the steps following the production thereof.

The embodiment of the process is explained in detail in the drawing, wherein 1 represents the iron removal tanks, 2 the input of the mixed grits, 3 the feed system for the approximately 20% hydrochloric acid, 4 the delivery of compressed air for the agitation in the iron removal tanks, 5 the connecting line between the iron removal tanks and the centrifugal separators, through which the solid suspension is taken from the tanks and delivered to the separators, 6 an indirect action pump, 7 the water supply, 8 intermediate tanks, 9 metering systems, 10 the centrifugal separators, 11 the lines for removing the hydrochloric acid waste matter, 12 a continuously operating filter system, 13 a drying apparatus, and 14 the system for removing the dry and iron-free grits.

The iron removal tank may be open on its head. A gas exhaustion usually is arranged above it. Its also possible to have a closed tank directly connected with an exhaustion. In both cases gaseous acid as well as decompressed air is so removed.

Via pipe 4a the suspension may taken off at the bottoms of the tanks 1 and by means of compressed air, introduced by line 4, suspension flows back to the tank at its head in manner of an indirect pumping system. Alternatively both tanks may be connected, both being provided with an agitation or indirect pump, in first one H Cl and grits are introduced, suspension getting by an overflow in to the second tank and being removed by means a line via pump 6 to the separators. Agitation also may be performed by direct bubbling in compressed air near the bottom of tanks 1.

The centrifugal separators may also be known as separating cyclones or hydrocyclones. These, only using centrifugal force and gravitation by means of tangential introduction of the suspension and having no movable parts, are more closely described in Chemie-Ing. Techn., 1955 Nr. 1 p. 13 – 17, especially page 17.

What is claimed is:

1. In a process of removing iron from grits of brown or white corundum, silicon carbide, zirconium corundum or garnet having a Mohs hardness of 7 to 9, with hydrochloric acid wherein:
   (a) a mixture of the grits and aqueous hydrochloric acid is agitated for removal of the iron from the grits and the provision of a first suspension of the grits in an aqueous hydrochloric acid medium in which the iron is dissolved, and the aqueous hydrochloric acid medium is removed from the grits, the improvement which comprises passing the grits serially through at least two hydrocyclones having no moving parts, adding water to the feed to each hydrocyclone, and in each hydrocyclone separating aqueous hydrochloric acid and forming a specifically heavier fraction containing the grits,
   (b) for the first hydrocyclone separation, adding water to said first suspension to form a second suspension and feeding the second suspension tangentially into the first hydrocyclone for centrifuging the second suspension in the first hydrocyclone and thereby separating therefrom a specifically lighter fraction rich in the hydrochloric acid and a first specifically heavier fraction rich in grits, the first specifically heavier fraction being removed from the bottom of the hydrocyclone,
   (c) for the second hydrocyclone treatment, adding water to said first specifically heavier fraction to form a third suspension and feeding the third suspension tangentially into a second hydrocyclone for centrifuging the third suspension in the second hydrocyclone and thereby separating the third suspension into a second specifically lighter fraction rich in hydrochloric acid and a second specifically heavier acid-free fraction rich in grits, the second specifically heavier acid-free fraction being removed from the bottom of the second hydrocyclone, and (d) the specifically heavier fraction produced in last hydrocyclone is filtered for preliminary dewatering to provide a filter cake containing the grits and the filter cake is dried to provide dried grits substantially free of iron, (e) said first suspension is continuously supplied to step (b) and the subsequent steps are performed continuously.

2. Process of claim 1, wherein the grits in said mixture of grits and aqueous hydrochloric acid are of grain size 2 up to 500 microns.

3. Process according to claim 1, wherein step (a) is performed in an agitating zone, and the first suspension is conveyed from the agitating zone to the hydrocyclone of step (b) with an indirectly acting pump.

4. Process according to claim 1, wherein the agitation of step (a) is according to by compressed air.

5. Process according to claim 1, wherein step (a) is performed batchwise in at least two iron removal vessels synchronized in operation to provide a continuous supply of said first suspension, and first suspension is continuously subjected to the steps following the production thereof.

6. Process according to claim 3, wherein step (a) is performed batchwise in at least two iron removal vessels synchronized in operation to provide a continuous supply of said first suspension, and first suspension is continuously subjected to the steps following the production thereof.

7. Process according to claim 1, wherein the specifically lighter fractions are withdrawn from the centrifugings from the center of the centrifuging zones.

8. Process according to claim 1, wherein the grits are crushed corundum.

9. Process according to claim 8, wherein the grits are crushed corundum of grain size of about 2 up to 500 microns.

10. Process according to claim 9, wherein step (a) is performed batchwise in at least two iron removal vessels synchronized in operation to provide a continuous supply of said first suspension.

11. Process according to claim 8, wherein the suspension of the grits of step (a) is subjected to steps (b) and (c) without separation of the grits into individual sizes.

12. Process of claim 3, wherein the agitation of step (a) is provided by compressed air.

13. Process of claim 12, wherein step (a) is performed batchwise in at least two iron removal vessels synchronized in operation to provide a continuous supply of said first suspension, and first suspension is continuously subjected to the steps following the production thereof.

* * * * *